US007865896B2

(12) United States Patent
Coppinger et al.

(10) Patent No.: US 7,865,896 B2
(45) Date of Patent: Jan. 4, 2011

(54) FACILITATING SCHEDULING OF JOBS BY DECOUPLING JOB SCHEDULING ALGORITHM FROM RECORDED RESOURCE USAGE AND ALLOWING INDEPENDENT MANIPULATION OF RECORDED RESOURCE USAGE SPACE

(75) Inventors: Richard J. Coppinger, Milton, NY (US); Alexander Druyan, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1419 days.

(21) Appl. No.: 11/300,784

(22) Filed: Dec. 15, 2005

(65) Prior Publication Data

US 2007/0143758 A1 Jun. 21, 2007

(51) Int. Cl.
 *G06F 9/46* (2006.01)
(52) U.S. Cl. .................................... 718/104
(58) Field of Classification Search .................. 718/104
 See application file for complete search history.

(56) References Cited

U.S. PATENT DOCUMENTS

| 5,671,361 | A | | 9/1997 | Brown et al. ................. 395/209 |
| 5,761,404 | A | * | 6/1998 | Murakami et al. ............. 714/15 |
| 6,618,820 | B1 | * | 9/2003 | Krum .......................... 714/13 |
| 6,625,636 | B1 | | 9/2003 | Skovira ....................... 709/102 |
| 6,694,345 | B1 | | 2/2004 | Brelsford et al. ............. 709/100 |
| 2002/0194248 | A1 | | 12/2002 | Wood et al. .................. 709/102 |
| 2003/0149717 | A1 | | 8/2003 | Heinzman .................... 709/101 |
| 2004/0015973 | A1 | | 1/2004 | Skovira ....................... 718/103 |
| 2004/0199918 | A1 | | 10/2004 | Skovira ....................... 718/102 |
| 2005/0010667 | A1 | * | 1/2005 | Moriki et al. ................ 709/226 |

(Continued)

FOREIGN PATENT DOCUMENTS

WO WO0029943 A1 5/2000

OTHER PUBLICATIONS

Y. Zhang et al., "Improving Parallel Job Scheduling by Combining Gang Scheduling and Backfilling Techniques," 14th International Parallel and Distributed Processing Symposium, IPDPS 2000, IEEE Computer Society Technical Committee on Parallel Processing, pp. 1-10 (May 1, 2000).

(Continued)

*Primary Examiner*—Lewis A Bullock, Jr.
*Assistant Examiner*—Blake Kumabe
(74) *Attorney, Agent, or Firm*—Matthew W. Baca, Esq.; Kevin P. Radigan, Esq.; Heslin Rothenberg Farley & Mesiti P.C.

(57) ABSTRACT

A method, system and program product are provided for facilitating scheduling of computer jobs of a computing environment having a plurality of resources. The method includes decoupling a job scheduling algorithm from responsibility for maintaining data structures for tracking recorded usage of the plurality of resources by computer jobs. The decoupling includes (i) providing resource space data structures separate from the job scheduling algorithm for recording usage of the plurality of resources by computer jobs; and (ii) providing operators for facilitating manipulation of values within the resource space data structures by the job scheduling algorithm and by one or more functions external to and independent of the job scheduling algorithm.

16 Claims, 9 Drawing Sheets

U.S. PATENT DOCUMENTS

2005/0076043 A1* 4/2005 Benedetti et al. ............ 707/100
2005/0081208 A1 4/2005 Gargya et al. ............... 718/100

OTHER PUBLICATIONS

P. Jones et al., "Scheduling for Parallel Supercomputing: A Historical Perspective of Achievable Utilization", Job Scheduling Strategies for Parallel Processing, IPPS/SPDP'99 Workcshop, JSSPP'99 Proceedings, Lecture Notes in Computer Science, vol. 1659, pp. 1-16 (Apr. 16, 1999).

Cynthia B. Lee, "Parallel Job Scheduling Algorithms and Interfaces", Department of Computer Science & Engineering, University of California, San Diego (clbailey@uscd.edu), pp. 1-16 (May 13, 2004).

* cited by examiner fig. 1 fig. 2 fig. 3 fig. 4 fig. 5 fig. 6 fig. 7 fig. 8 fig. 9 fig. 10 fig. 11 fig. 12 fig. 13 fig. 14 fig. 15

FACILITATING SCHEDULING OF JOBS BY DECOUPLING JOB SCHEDULING ALGORITHM FROM RECORDED RESOURCE USAGE AND ALLOWING INDEPENDENT MANIPULATION OF RECORDED RESOURCE USAGE SPACE

TECHNICAL FIELD

This invention broadly relates to data processing techniques, and more particularly, to a technique for facilitating scheduling of computer jobs of a computing environment employing a decoupling of the job scheduling algorithm from responsibility for maintaining recorded usage of computing environment resources by computer jobs.

BACKGROUND OF THE INVENTION

Scheduling techniques are used to schedule computer jobs in a computing environment so that the resources of the environment are efficiently utilized. Traditionally, resource bookkeeping is buried at the lowest levels of the job scheduling logic, making it difficult and time consuming to extend existing job scheduling algorithms with novel paradigms, such as backfill and preemption. Resource bookkeeping is the tracking of used, free, bad, and to-be-used resources in the job scheduling algorithm With current job scheduling algorithms, which allow a large variety of scheduling options, such as scheduling by hostlist, blocking, packing, etc., trying to extend the existing algorithms to support new, moderately complex scheduling paradigms, and at the same time maintain correctness of the current options, often requires substantial structural modifications to most of the underlying options. Typically, most of the currently supported scheduling options must also be supported by the new paradigms. As a result, introduction of new paradigms has a substantial impact on the existing code base. Development and testing cycles along with product quality are thus greatly effected.

SUMMARY OF THE INVENTION

The shortcomings of the prior art and additional advantages are provided, in one aspect, through a method of facilitating scheduling of computer jobs of a computing environment comprising a plurality of resources. The method includes: decoupling a job scheduling algorithm from responsibility for maintaining data structures for tracking recorded usage of the plurality of resources by computer jobs, the decoupling including: (i) providing resource space data structures separate from the job scheduling algorithm for recording usage of the plurality of resources by computer jobs; and (ii) providing operators for facilitating manipulation of values within the resource space data structures by the job scheduling algorithm and by one or more functions external to and independent of the job scheduling algorithm.

In further aspects, the resource space data structures include resource amount data structures comprising recorded usage of the plurality of resources by scheduled jobs at defined points in time. Each resource amount data structure is associated with a particular resource of the plurality of resources of the computing environment, and each includes a "real" field indicative of an amount of the resource employed at a current time, a "virtual" field, indicative of at least one virtual amount of the resource to be employed at one or more particular times, and a "requirements" field, for temporary data storage to facilitate manipulation of values within the "real" field and the "virtual" field employing the operators.

The "real" field of each resource amount includes an actual amount of the resource currently being employed, and each virtual amount of the "virtual" field includes the actual amount currently being employed in addition to an amount increase or decrease comprising an amount of the resource virtually employed as a result of one or more decisions of the job scheduling algorithm. In one embodiment, the at least one virtual amount of the "virtual" field is a vector of virtual amounts that provide virtual resource usage at various increments of time.

In another aspect, the resource space data structures further include a resource space time data structure for the computing environment. The resource space time data structure includes multiple virtual times, each virtual time being associated with a respective virtual amount of at least one resource amount data structure. The resource space time data structure further includes a current virtual space indicative of a virtual space currently being considered by the job scheduling algorithm, and a last interfering virtual space indicative of a virtual space up to which the job scheduling algorithm considers when considering the current virtual space. The multiple virtual times, current virtual space and last interfering virtual space are global variables for the plurality of the resources of the computing environment.

In yet further aspects, the job scheduling algorithm makes job scheduling decisions by manipulating the resource space data structures employing the operators, and the job scheduling algorithm had no knowledge from which resource space data structure a particular resource usage amount originates. The operators specify a set of resource space data structures that the job scheduling algorithm employed in making a particular scheduling decision. The operators are generic operators employing across the resource space data structures. Various examples of data structures and operators are described and claimed.

Systems and computer program products corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

One embodiment of a computing environment to incorporate and use one or more aspects of the present invention is initially described with reference to FIG. 1. As one example, the computing environment 100 is depicted as a distributed computer system.

The distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well-known by those skilled in the art.

All of the nodes in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 referred to as the System Shared Disk on which is stored the system data repository (SDR) files. The SDR files include such information as a list of nodes that are in the system and their configuration, and includes resources and object definitions for each of the nodes 106. Each node 106 also includes a DASD device 107 for storing data processed by the SP computer 100.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As is well understood in the art, the CWS node 112 sends system data and control signals to the frames of the SP computer 100 by means of the LAN 102 while messages and data may be sent from one another of the nodes 106 by means of the high performance switches 105.

Figure 1:
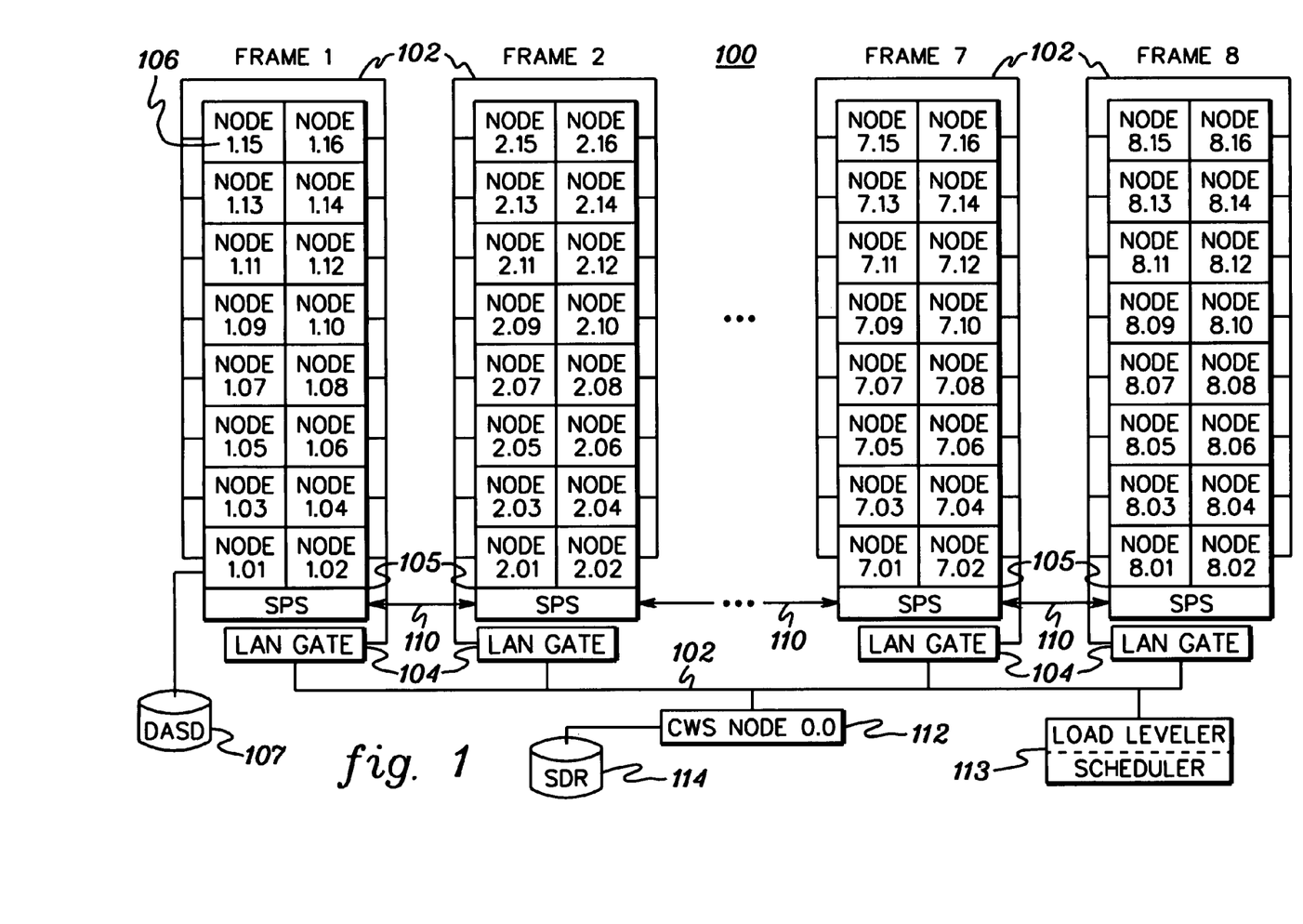
FIG. 1 depicts one embodiment of a computing environment to incorporate and use more aspects of the present invention.

Also shown in FIG. 1, is an internal task or job scheduler, such as the IBM Load Leveler Parallel Batch Scheduler 113. The Load Leveler Parallel Batch Scheduler is a commercially available product marketed by IBM, and although shown as a discrete block in FIG. 1, actually is a distributed scheduler residing on each node of the distributed processing system. In addition to being a batch system control, the Load Leveler program is also a job scheduler.

To efficiently utilize the resources of the computing environment, scheduling techniques are used to schedule execution of computer jobs of the environment. One type of scheduling technique is a backfill scheduling algorithm that determines when resources will be available at a later time for use by waiting jobs. One example of a backfill scheduling technique is described in "The EASY-LoadLeveler API Project", Job Scheduling Strategies for Parallel Processing, edited by Dror G. Feitelson and Larry Rudolph, pp. 41-47, Springer-Verlag, 1996, Lecture Notes on Computer Science, Vol. 1162, which is hereby incorporated herein by reference in its entirety.

As noted above, resource bookkeeping is traditionally buried in the lowest levels of the job scheduling logic, making it difficult and time consuming to extend existing job scheduling algorithms with new paradigms, such as backfill and preemption. (Again, this resource bookkeeping is the tracking of used, free, bad, and to-be-used resources in the job scheduling algorithm.) In view of this, presented herein is a clear and well-defined decoupling of the job scheduling algorithm from responsibility for maintaining the job's recorded resource usages, with operations being provided for manipulation of the resulting resource spaces from either the scheduling algorithm or from outside of the underlying job scheduling algorithm. Without such decoupling of the scheduling algorithm from the resources, at every point where the job scheduling algorithm needs to evaluate a particular value of the resource, it needs to execute a relatively complex conditional statement to determine which value should be used. Thus, addition of a new scheduling paradigm traditionally requires a complete revamping of every conditional statement at every point where the scheduler needs to access the value of the resource. This requires substantial programming and testing efforts to ensure that both existing and new functionality work to specification.

In accordance with an aspect of the present invention, the concept of resource space data structures is introduced, along with a defined set of operations on the structures, which allow for the decoupling of the job scheduling algorithm from the requirement of tracking job resource usage. A resource space is a snapshot of resource usages at a defined moment in time. As explained further below, a resource space data structure includes a set of resource usage amounts. Key operations on the resource spaces allow the underlying resource usage amounts to be initialized, incremented and decremented. Further, operations are defined for specifying the set of resource spaces that the scheduling algorithm sees in making a scheduling decision. The scheduling algorithm accesses a resource usage amount via the interface (i.e., the operators provided), and has no knowledge from which resource space the resource usage amount originates. When scheduling jobs, it is necessary to consider the resources that are occupied at a particular moment in time, as well as additional constraints imposed by existing requirements. Sometimes, it is necessary to consider only the resources that are occupied in the cluster at the present moment in time, sometimes also those which have been reserved for future use (when scheduling a backfilling job) or when there is an advance reservation present (for example), and sometimes the resources which will be occupied at some future moment in time (e.g., when computing an earliest top-dog start time), etc.

Advantageously, resource space data structures as disclosed herein, and the operators or operations provided for manipulating values within the data structures, can be used to transparently integrate new paradigms into existing job scheduling algorithms with a much greater efficiency. The concepts presented herein allow for the application of modular and object oriented programming paradigms to modern job scheduling algorithms.

Figure 2:
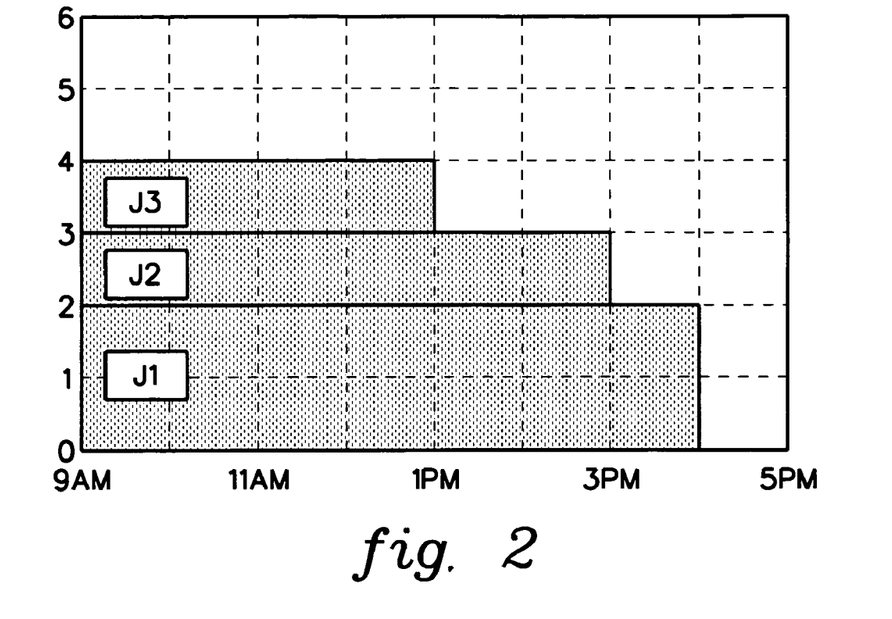
FIG. 2 depicts an example of resource usage by running computer jobs of a computing environment.

FIG. 2 is a depiction of resources of a computing environment occupied by three currently running jobs, referred to as job J1, J2 & J3. In this example, six units of a resource of the computing environment are available in total at any given time. From 9 am to 4 pm, 4 resource units are used, and two are free. From 1 pm to 3, three resource units are used, and three are free, while from 4 pm to 5 pm, two resource units are used, and four are free. The three jobs, J1, J2 & J3 have corresponding resource usages of 2, 1 and 1. Jobs J1, J2, J3 end at 1 pm, 3 pm and 4 pm, respectively. Suppose, for example, a new job J4 arrives for scheduling. This new job requires three units of resources and must run for four hours. Clearly, there are insufficient resources to run the job currently at 9 am. Thus, the earliest time the job can start is 1 pm. This future running of job J4 at 1 pm is depicted at FIG. 3.

Figure 3:
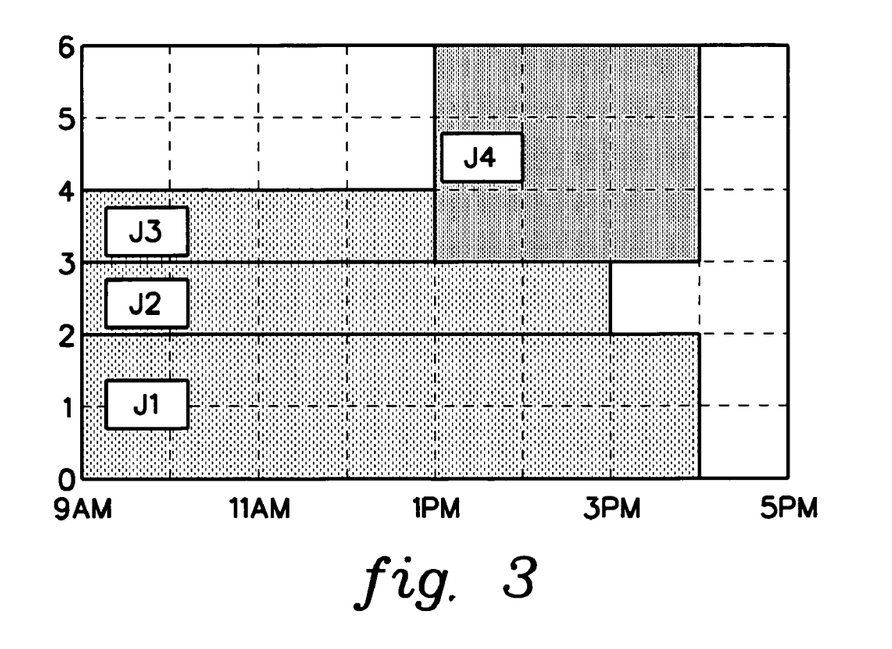
FIG. 3 depicts the resource usage example of FIG. 2, showing the addition of a scheduled job J4 to be run at a future time.

As shown in FIG. 3, without job J4 scheduled to start at 1 pm, it is known that at 9 am, four units of resource at are used, while at 1 pm, three units of resource are used. With job J4 scheduled to start, it is known that at 1 pm, six units of resources are used. Suppose, for example, that a new job J5 arrives, which requires one unit of resource and must run for four hours. Clearly, this new job will be able to start currently at 9 am, which is depicted in FIG. 4.

Figure 4:
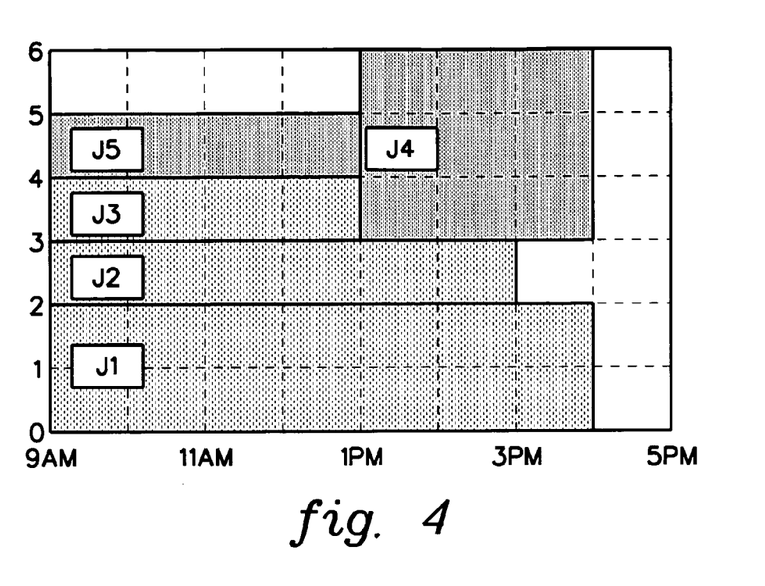
FIG. 4 depicts the resource usage example of FIGS. 2 & 3 with the addition of a further job J5 which is backfilled as a currently running job, and which illustrates three basic accounting entities of a resource space data structure, in accordance with an aspect of the present invention.

As shown in FIG. 4, it is known that at 9 am, four units of resource are occupied by running jobs J1, J2, J3 and one more unit of resource is about to be occupied by job J5. At 1 pm, three units of resource are occupied by running jobs J1, J2 and three more units of resource are set aside for job J4. Thus, fundamentally, there are three basic accounting entities.

What is really occupied by running jobs. This entity is referred to herein as the "real" resource amount and is noted by the variable "R". In FIG. 4, the time of R is 9 am, and R=4.

What will be occupied by running jobs after all decisions made by the scheduling cycle are carried out. This entity is referred to as the "virtual" resource amount 0 and is denoted by "V0". In FIG. 4, the time of V0 is 9 am, and V0=5.

What will be occupied by running jobs at some future time. This future time is referred to as the virtual resource amount 1, and is denoted by "V1". In FIG. 4, the time of V1 is 1 pm, and V1=6.

Since there can be many resource types in one installation, a group of real resource amounts is denoted as the real resource space, and virtual resource amounts are denoted as the virtual resource space. "R", "V0" and "V1" are sets of resource amounts. Resource spaces form a set {R, V0, V1}. Virtual resource spaces are not restricted to just V0 and V1. In fact, it may be convenient to have many virtual resource spaces. Each virtual resource space corresponds to resource usages at some point in time.

Figure 5:
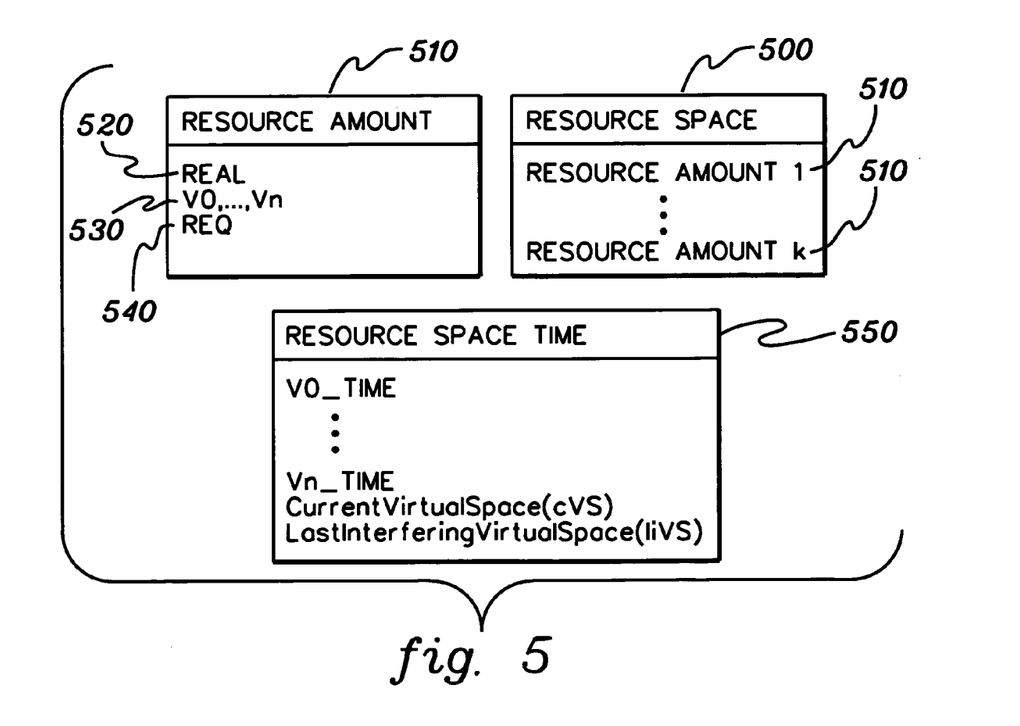
FIG. 5 illustrates one example of resource space data structures comprising a resource space with multiple resource amounts, and a resource space time structure, in accordance with an aspect of the present invention.

FIG. 5 depicts one example of resource space data structures, in accordance with an aspect of the present invention. A resource space structure, generally denoted 500, is a snapshot of resource usages at a defined moment in time, be it a present, a future or a more general moment in time. The resource being used might comprise any type of computing environment resource, such as available memory, adapter windows, disk space, etc. The resource space 500 includes one or more resource amounts 510, one for each resource of the computing environment.

A resource amount is defined to include a real value 520 denoted by "R", and a virtual value or vector denoting values V0, V1 . . . Vn 530. Resource space R is a snapshot of the actual state of the resource usages in the cluster at the present moment in time. For instance, take a simple cluster with only one resource X which is integral and takes on values from {0 . . . 10}. There are two jobs running in the cluster, J1 & J2 which use four and two units of resource X, respectively. The resource usage amount of X in the resource space R is clearly R_X=6. Resource space R changes only when the resource usages inside the cluster change. Resource spaces Vi, on the other hand, are a less constrained representation of the resource usages. Changes to virtual resource spaces are not exclusively dependent on the actual changes of resource usages within the cluster. Virtual resource spaces encapsulate the changes which occur to resource usages as a result of actions which might be considered by the scheduling paradigms. For example, some scheduling paradigms might need to check whether job J3 (which needs five units of X), will be able to start after job J2 completes at time Ti. Virtual resource space Vi will be set to represent the resource usages in the cluster at time Ti by first initializing Vi to be equal to R, and then decrementing the resource usages in Vi by whatever job J2 is using. Resource X's usage in Vi will be initialized to 6, then decremented by 2. At time Ti, resource usage amount of X in Vi is 4, and job J3 is able to start in the Vi space.

In addition to the real and virtual resource spaces, a requirements on resource space is defined, which is denoted by "Req" 540. This space is used mainly for storing a snapshot of jobs resource requirements and for manipulation of R and V with that snapshot. The resource usages in the resource spaces R and V are increased/decreased by the resource amounts in the Req space. Going along the lines of the example given above, decreasing resource usage of X in Vi by whatever job J2 is using is broken down into the following steps: (1) initialize X and Req to zero; (2) increase X and Req by job J2's resource usage of X, which is 2, making X=2 in Req; and (3) decrease X in Vi by X in Req, making X=6−2=4 in Vi. From these simple operations, the generic operators on different resource spaces are derived.

Let Res(J) denote job J's resource usage in the cluster. Further, the value of X in a resource space denotes the resource usage of X in that space. So in the following definitions, the "plus" operator increases resource usages, and conversely, the "minus" operator decreases resource usages. Note that the operations are required to be both commutative and associative.

Defined operations on resource spaces:

$Req=0$ $Req=Req+Res(J)$ $Req=Req-Res(J)$

Req=MAX{Req, 0}

R=R+Req

R=R−Req

V0=R

Vi=Vi−1

Vi=Vi+Req

Vi=Vi−Req

Together with the definition of what the resource spaces are and how they are available to the job scheduling algorithm, the above operations on the resource spaces form a generic framework for maintaining the state of the resource usages in the cluster. This framework is flexible enough to be used for job scheduling and for extending the current job scheduling functionality with novel scheduling paradigms.

The following are simple examples to demonstrate how this framework fits in to the job scheduling domain:

Starting job J:
  (1) Req=0; (2) Req=Req+Res(J); (3) R=R+Req

Terminating job J:
  (1) Req=0; (2) Req=Req+Res(J); (3) R=R−Req

Compute resource usage without job J running:
  (1) V0=R; (2) Req=0; (3) Req=Req+Res(J); (4) V0=V0−Req Compute remaining resource requirement for J1 given that it preempts J2 and J3 which gives up all its resources to J1:
  (1) Req=0; (2) Req=Req+Res(J1); (3) Req=Req−Req(J2); (4) Req=Req−Req(J3); (5) Req=MAX{Req, 0}

Many other, more complicated job scheduling scenarios can be implemented using the above framework.

In order to implement the resource spaces with existing job scheduling algorithms, a convenient data structure is defined which is denoted as the ResourceAmount. This object is instantiated for every resource which is used within the job scheduling algorithm. Each ResourceAmount object encapsulates all of the resource usages within the resource spaces (the real, virtual, and requirements on resources) and all of the operations which can be performed on them (Req=0, Vi=Vi+Req, etc). As a set, all of the ResourceAmount instances in the job scheduling system represent the underlying resources spaces.

The ResourceAmount object includes the following data members:

amountUsed—holds the real resource space's total resource usage of the represented resource.
  amountIncrement—array; amountIncrement[0] holds the difference of V0's and R's resource usages of the represented resource; for i greater than 0, amountIncrement[i] holds the difference of Vi's and Vi−1's resource usages of the represented resource.
  amountRequirement—holds the resource requirement from the requirements on resources resource space of the represented resource.

From the above representation, given a ResourceAmount instance RA, the values of the resource usages of the represented resource in different resource spaces are acquired as follows:

Real part of RA: amountUsed
  Vi part of RA: amountUsed+amountIncrement[0]+ . . . +amountIncrement[i]
  Req part of RA: amountRequirement Definition: A job J is said to interfere with virtual resources space Vi if the time assigned to Vi is earlier than the expected end time of job J.

It should be noted that the Vi resource usages are stored incrementally inside of the ResourceAmount objects. Thus, when amountUsed of the ResourceAmout object changes, changing the value of resource usage in the R space, this in turn changes the values of the resource usages in the virtual spaces.

Figure 6:
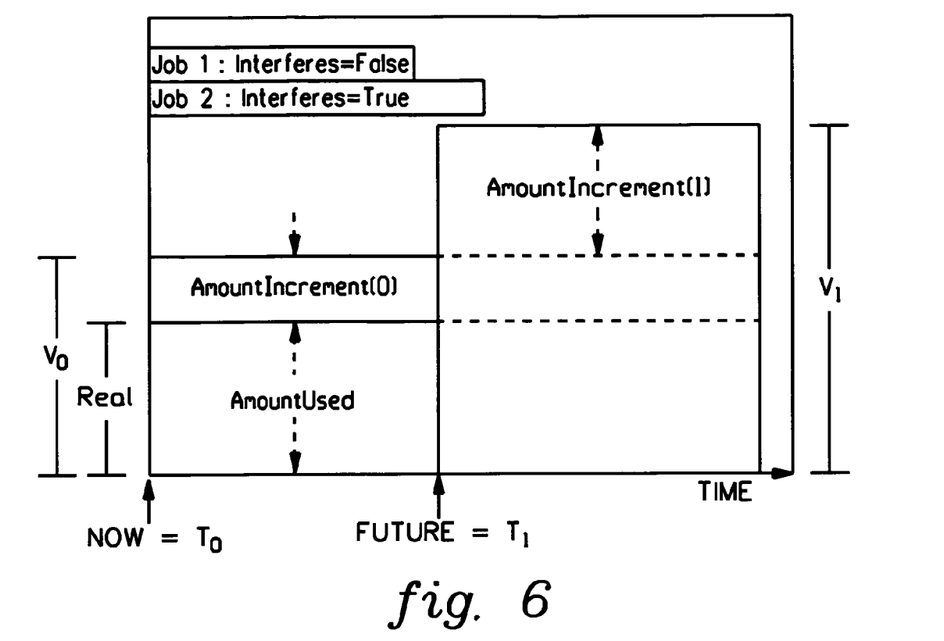
FIG. 6 is a resource amount object diagram for a resource space data structure, in accordance with an aspect of the present invention.

FIG. 6 illustrates the different components of the resource amount object, along with interaction of the R and V spaces, and the relation of jobs to the different virtual spaces. In this figure, it is assumed that a job J1 is expected to complete before the time assigned to V1, and a job J2 is expected to complete after the time assigned to virtual space V1. The time assigned to V0 is identical to the time assigned to R, which is the current (present moment in time). Space V1, on the other hand, is assigned some later moment in time. Values of the amountIncrement [i] can be either positive or negative, implying either an increase in the amount of used resources or a decrease, respectively.

In addition to the resource amount data structure, FIG. 5 illustrates a global resource space time structure 550. This structure includes a time variable V0_time for each virtual space variable (V0_time, . . . Vn_time). These virtual space time values correspond to the global time for the designated virtual space.

Additionally, the job scheduling algorithm needs to know, at least indirectly, which virtual resource space it is working in and with which virtual resource spaces the jobs which it is considering interfere with.

A current Virtual Space (curVS or cVS) variable is defined as the virtual space in which the scheduling of jobs is assumed to take place. Further, a last interfering virtual space (liVS) variable is defined as the last virtual space whose assigned time is earlier than the expected end time of the job(s) under consideration. In FIG. 6, when scheduling job 1 in the V0 space, one would set curVS to 0, and liVS to 0. When scheduling job 2, on the other hand, one would set curVS to 0, and liVS to 1 (since in the above example job 2 is expected to end after V1's assigned time). Given a job and curVS and liVS, it is assumed that the scheduling happens in the curVS, and that the job interferes with all the spaces from curVS to liVS, inclusive. The virtual spaces are ordered by their assigned time.

In addition to the ResourceAmount objects outlined above, several other functions are provided to enable the integration of the current code base with the resource spaces concepts.

getCurrentVirtualSpace( ) returns curVS.
  setCurrentVirtualSpace(i) sets curVS to i
  getLastInterferingVirtualSpace( ) returns liVS
  setLastInterferingVirtualSpace(i) sets liVS to i.

In the above example, in order to "prepare" the curVS and liVS when scheduling job 2, the setCurrentVirtualSpace(0) and setLastInterferingVirtualSpace(1) are invoked.

A number of accessors within the ResourceAmount objects are defined, which combine the resource space concepts with the curVS/liVS concepts and make it transparent to the job scheduling algorithm the knowledge of the virtual space(s) the algorithm is working in.

getReal( ) returns the amount of the resource in the real resources space (amountReal of ResourceAmount)
  getVirtual( ) returns the MAX{amount of resource used in V_curVS . . . , V_liVS}
  increaseReal(AMOUNT) increases the amount of resource used in R, V0, . . . , V_liVS by AMOUNT decreaseReal(AMOUNT) decreases the amount of resource used in R, V0, . . . , V_liVS by AMOUNT increaseVirtual(AMOUNT) increases the amount of resource used in V_curVS, . . . , V_liVS by AMOUNT decreaseVirtual(AMOUNT) decreases the amount of resource used in V_curVS, . . . , V_liVS by AMOUNT With all of the above concepts/definitions, the required changes to a current job scheduling algorithm are relatively minimal.

- The variables which hold the state of the resources become ResourceAmount objects.
- In the code for the job scheduling algorithm responsible for making decisions about whether and where the job can run, each access to the resource variables is done via getVirtual( ), increaseVirtual(a), decreaseVirtual(a).
- In the code for the job scheduling algorithm responsible for handling resource usage changes within the cluster, each access to the resource variables is done via getReal( ), increaseReal(a), decreaseReal(a).
- In the code for the job scheduling algorithm responsible for reporting the state of the resource usage within the cluster, each access to the resource variables is done via getReal( ).
- Extra code is added before invoking the original job scheduling code to correctly initialize the resource spaces and the curVS/liVS.

By way of further explanation, FIGS. 7-14 are flowcharts of processing performed by various operators provided in accordance with an aspect of the present invention for facilitating manipulation of values within the resource space data structures described herein.

Figure 7:
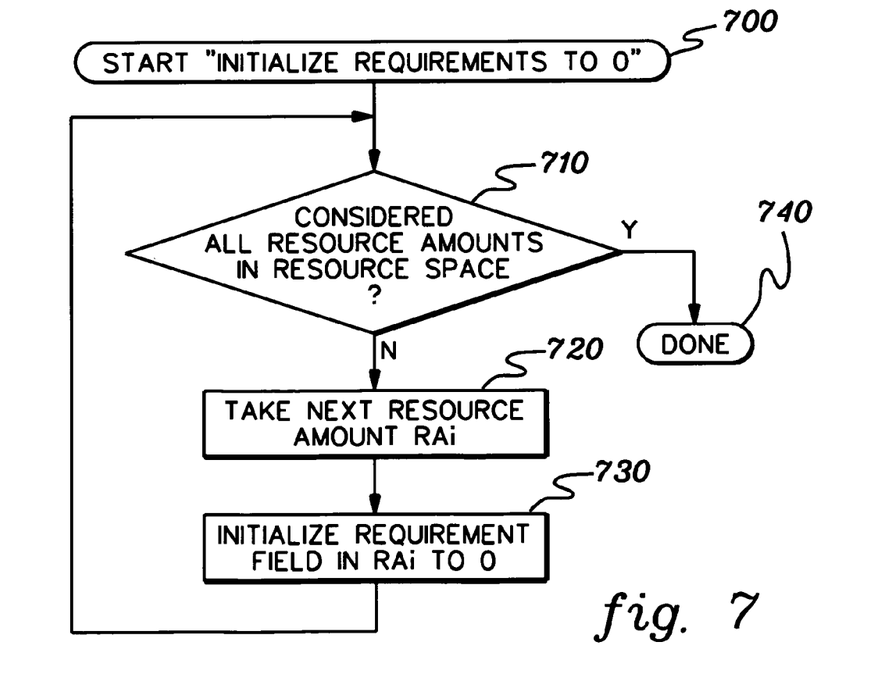
FIG. 7 is a flowchart of one example of an "initialize requirements to 0" operator, in accordance with an aspect of the present invention.

FIG. 7 is a flowchart of one embodiment of an operator "Req=0" process. Processing starts the initialize requirements to zero 700 by inquiring whether all resource amounts in the resource space have been considered 710. If "no", then a next resource amount RAi is obtained 720 and the requirement field in this resource amount RAi is initialized to zero 730. Once all resource amounts in the resource space have been considered, then the operator is done 740.

Figure 8:
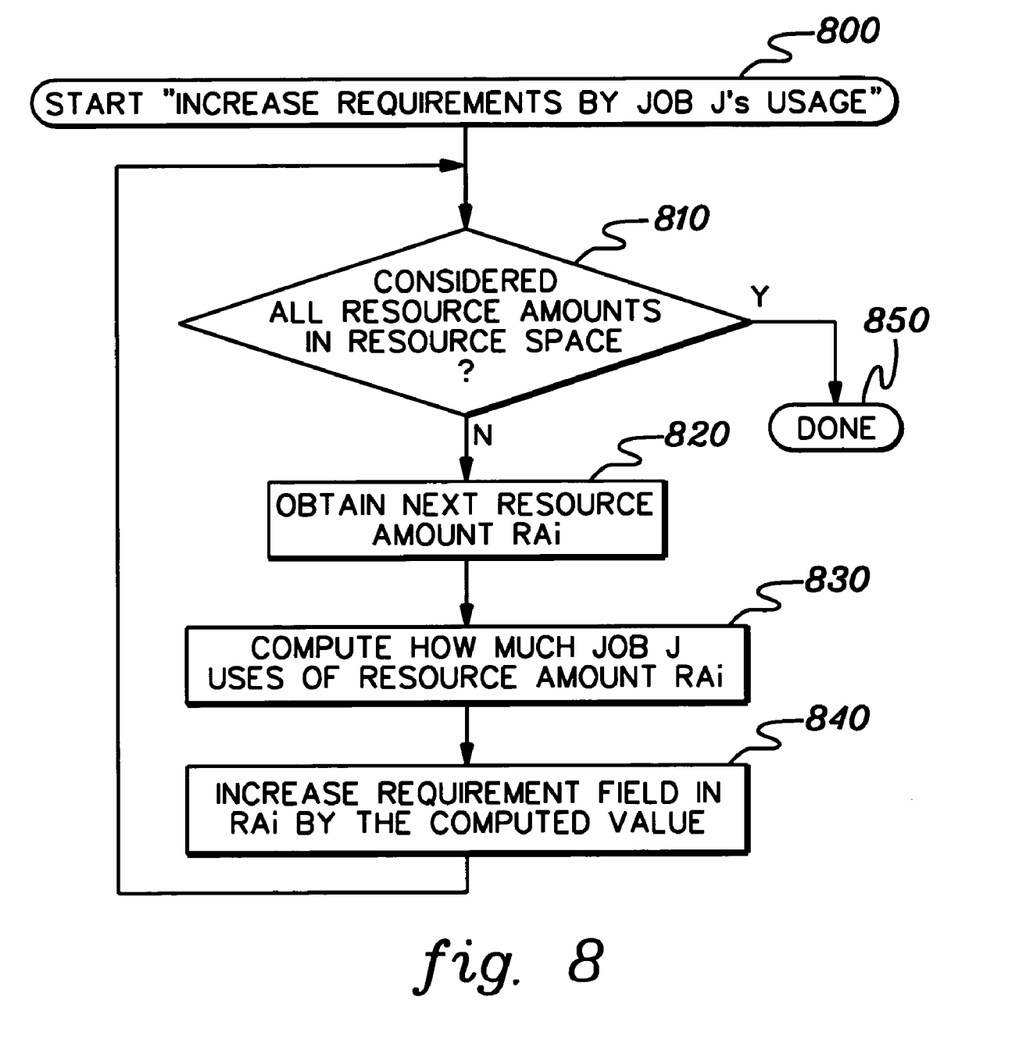
FIG. 8 is a flowchart of one embodiment of an "increase requirements by job J's usage" operator, in accordance with an aspect of the present invention.

FIG. 8 is a flowchart of one embodiment for an operator "Req=Req+Res (job J)". Processing of this operator begins 800 by inquiring whether all resource amounts in the resource space have been considered 810. If "no", then a next resource amount RAi is obtained 820 and processing computes how much job J uses of resource amount RAi 830. The requirement field in RAi is then increased by the computed value 840. Once all resource amounts have been considered, processing is complete 850.

Figure 9:
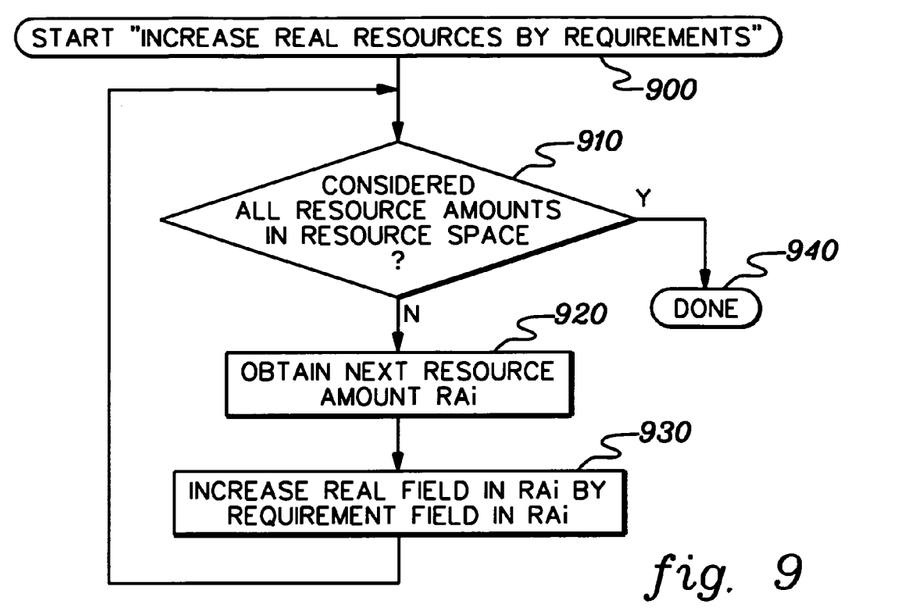
FIG. 9 is a flowchart of one example of an "increase real resources by requirements" operator, in accordance with an aspect of the present invention.

FIG. 9 is an example of the "Real=Real+Req" operator. This process begins 900 by processing inquiring whether all resource amounts in the resource space have been considered 910. If "no", then a next resource amount RAi is obtained 920, and the real field in resource amount RAi is increased by the requirement field in RAi 930. Once all resource amounts have been considered, processing is complete 940.

Figure 10:
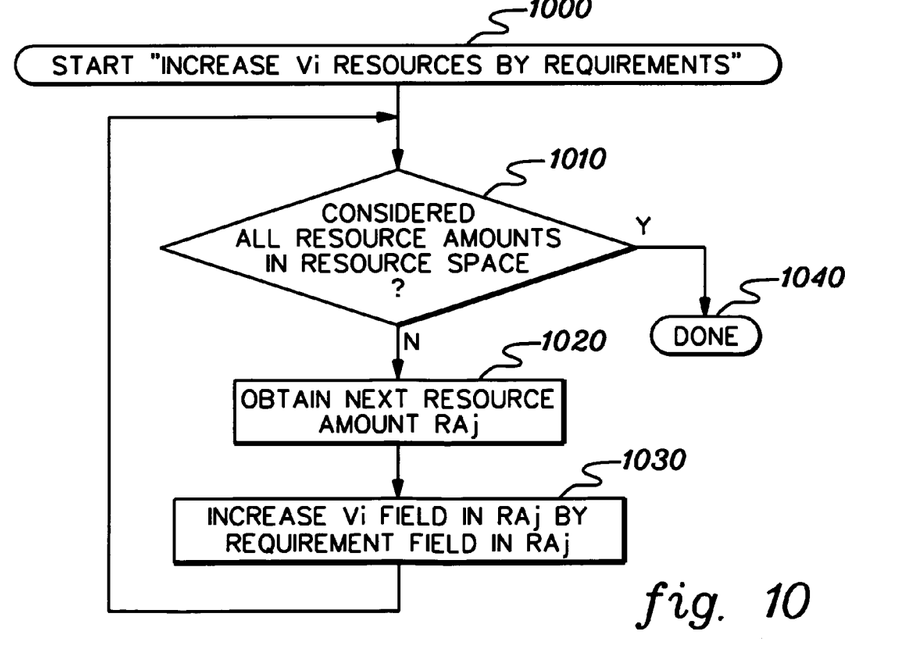
FIG. 10 is a flowchart of one embodiment of an "increase Vi resources by requirements" operator, in accordance with an aspect of the present invention.

FIG. 10 is an example of the "Vi=Vi+Req" operator. This processing begins 1000 by inquiring whether all resource amounts in the resource space have been considered 1010. If "no", then a next resource amount RAj is obtained 1020, and the virtual field Vi is increased in resource amount RAj by the requirement field in RAj 1030. Once all resource amounts have been considered, processing is complete 1040.

Figure 11:
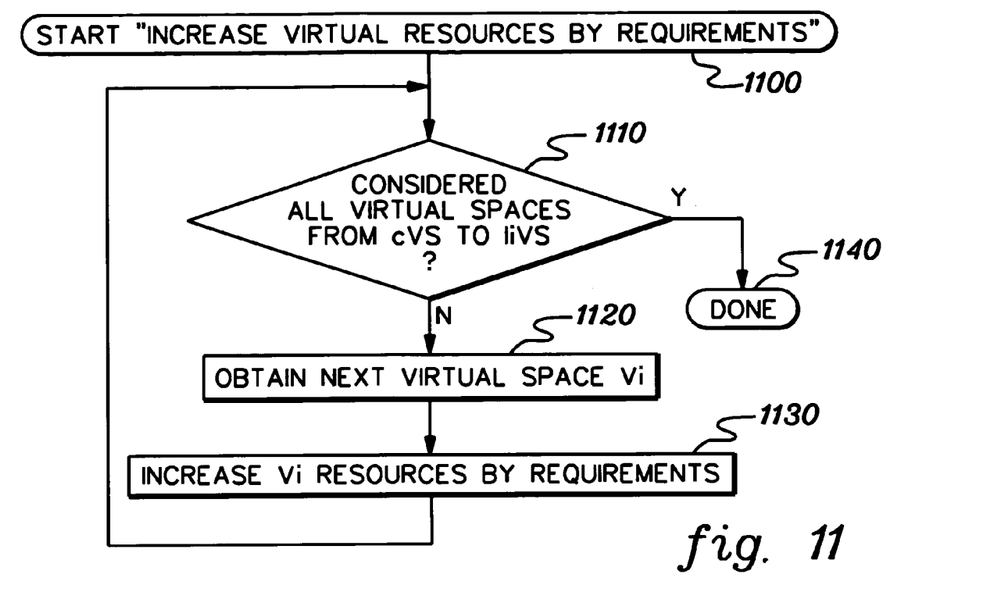
FIG. 11 is a flowchart of one embodiment of an "increase virtual resources by requirements" operator, in accordance with an aspect of the present invention.

FIG. 11 depicts one example of a "Virtual=Virtual+Req" operator. Processing of this operator begins 1100 by determining whether all virtual spaces have been considered from the current virtual space (cVS) to a last interfering virtual space (ViVS) 1110. If "no", then a next virtual space Vi is obtained 1120, and Vi resources are increased by their requirements field 1130. Once all virtual spaces from cVS to liVS has been considered, processing is complete 1140.

Figure 12:
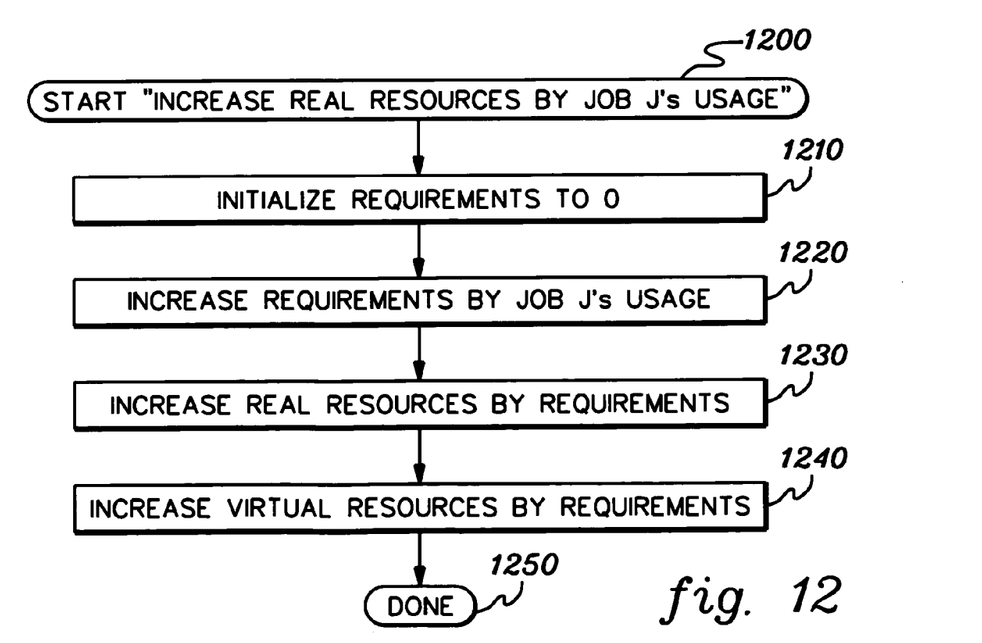
FIG. 12 is a flowchart of one embodiment of an "increase real resources by job J's usage" operator, in accordance with an aspect of the present invention.

FIG. 12 depicts one embodiment of a "Real=Real+Res (job J)" operation, which corresponds to the "starting job J" procedure noted above. Processing begins 1200 by initializing the requirements field to zero 1210 (see FIG. 7). The requirements field is then increased by job J's usage requirements 1220 (see FIG. 8), and the real resources are increased by the requirements field 1230 (see FIG. 9). The virtual resources are also increased by the requirements field 1240 (see FIG. 11), which completes the processing 1250.

Figure 13:
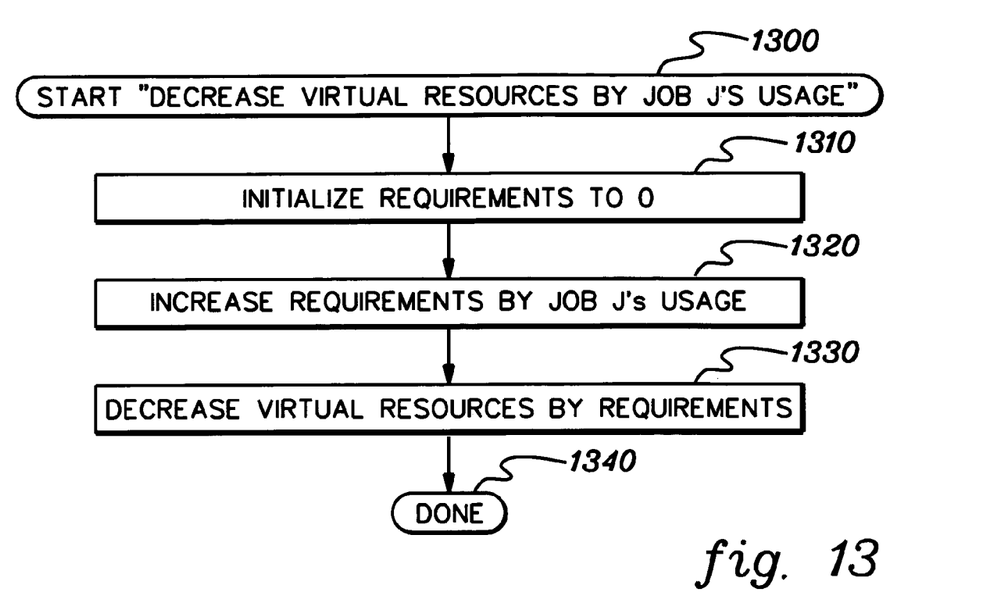
FIG. 13 is a flowchart of one embodiment of a "decrease virtual resources by job J's usage" operator, in accordance with an aspect of the present invention.

FIG. 13 depicts one example of a "Virtual=Virtual−Res (job J)" operator. This processing begins 1300 by initializing the requirements field to zero 1310. The requirements field is then increased by job J's usage 1320, and the virtual resources are decreased by the requirements value 1330, which completes processing of the operator 1340. This operator corresponds to the "compute resource usage without job J running" process noted above.

Figure 14:
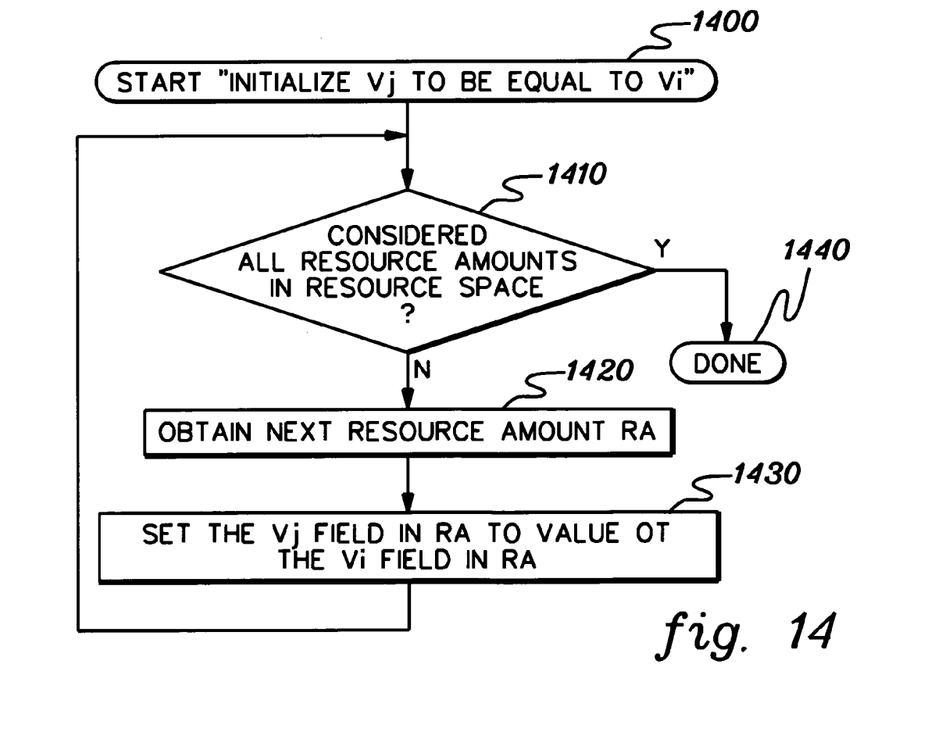
FIG. 14 is a flowchart of one embodiment of an "initialize Vj to be equal to Vi" operator, in accordance with an aspect of the present invention.

FIG. 14 is an example of a "Vj=Vi" operator, which initializes Vj to be equal to Vi. Processing begins 1400 by determining whether all resource amounts in the resource space have been considered 1410. If "no", then a next resource amount RA is obtained 1420, and the Vj field in this resource amount RA is set to the value of the Vi field in RA 1430. Once all resource amounts in the resource space have been considered, processing is complete 1440.

Figure 15:
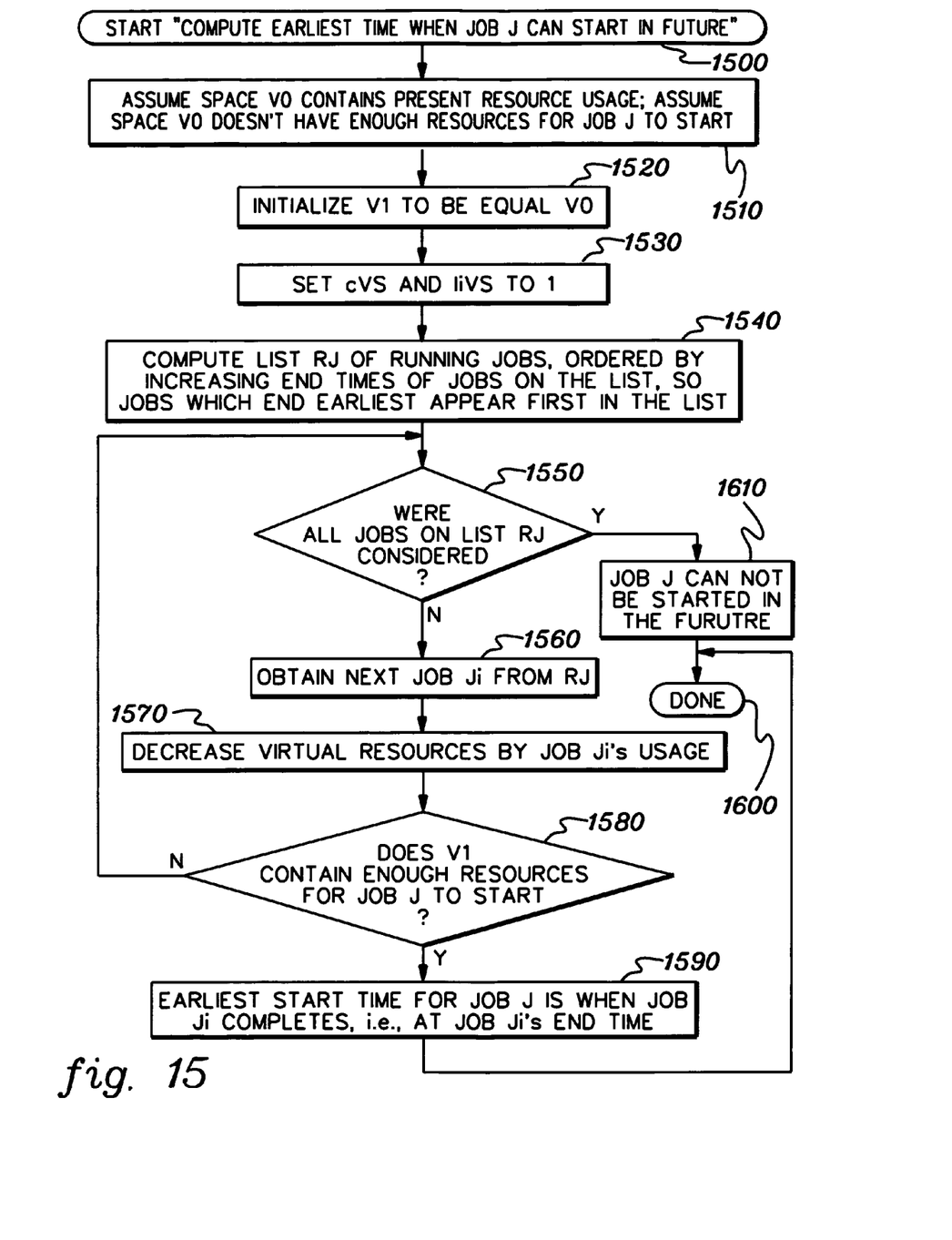
FIG. 15 is a flowchart of one embodiment of a process for employing resource spaces and the operators of FIGS. 13 & 14 in computing an earliest time when a job can start in the future, in accordance with an aspect of the present invention.

FIG. 15 is an example of processing using the resource spaces and operators described herein to compute an earliest time when a job can start in the future. This processing begins 1500 by assuming that space V0 contains the present resource usage, and space V0 does not have enough resources for job J to start 1510. Space V1 is initialized to be equal to space V0 1520, which employs the operator of FIG. 14. Next, the current virtual space (cVS) and the last interfering virtual space (liVS) are set to one 1530. A list RJ of running jobs is computed, and ordered by increasing end times of jobs so that jobs which end earliest appear first in the list 1540. Processing then determines whether all jobs in list RJ have been considered 1550. If "no", then a next job Ji is obtained from list RJ 1560, and the virtual resources are decreased by job Ji's usage 1570, which uses the operator of FIG. 13. Processing then determines whether space V1 contains enough resources for job J to start 1580. If "no", then processing returns to determine whether all jobs in the list RJ have been considered 1550. Otherwise, an earliest start time for job J is set when job Ji completes, i.e., at job Ji's end time 1590, which completes processing 1600. If all jobs on the list RJ have been considered 1550, then job J cannot be started in the future 1610, and processing is complete 1600.

The detailed description presented above is discussed in terms of program procedures executed on a computer or network of computers. These procedural descriptions and representations are used by those skilled in the art to most effectively convey the substance of their work to others skilled in the art. They may be implemented in hardware or software, or a combination of the two.

A procedure is here, and generally, conceived to be a sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

The invention is preferably implemented in a high level procedural or object-oriented programming language to communicate with a computer. However, the invention can be implemented in assembly or machine language, if desired. In any case, the language may be a compiled or interpreted language.

The invention may be implemented as a mechanism or a computer program product comprising a recording medium. Such a mechanism or computer program product may include, but is not limited to CD-ROMs, diskettes, tapes, hard drives, computer RAM or ROM and/or the electronic, magnetic, optical, or other storage devices Indeed, the mechanism may include any solid or fluid transmission medium, magnetic or optical, or the like, for storing or transmitting signals readable by a machine for controlling the operation of a general or special purpose programmable computer according to the method of the invention and/or to structure its components in accordance with a system of the invention.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such the electronic test equipment). The system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computer system or other apparatus. The required structure for a variety of these systems will appear from the description given.

Again, the capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating scheduling of computer jobs of a computing system comprising a plurality of resources, the method comprising:
    separating a job scheduling algorithm responsible for scheduling the computer jobs from processing to manipulate resource space data structures, the resource space data structures comprising a plurality of data members for tracking recorded usage of the plurality of resources by the computer jobs, the separating comprising:
        (i) providing resource space data structures for recording usage of the plurality of resources by computer jobs; and
        (ii) providing processing operators for facilitating manipulation of at least one value of at least one data member of the plurality of data members of the resource space data structures, wherein the job scheduling algorithm accesses the processing operators to manipulate the at least one value of the at least one data member, thereby facilitating maintaining the resource space data structures separate from the job scheduling algorithm,
    wherein the job scheduling algorithm makes job scheduling decisions by, in part, manipulating the at least one value of the at least one data member employing the processing operators wherein the resource space data structures comprise resource amount data structures, the resource amount data structures comprising data members of the plurality of data members, the data members including recorded usage of the plurality of resource by scheduled computer job at defined points in time, and wherein each resource amount data structure facilitates tracking usage of a particular resource of the plurality of resources of the computing system, and each resource amount data structure comprises a "real" field, indicative of an actual amount of the resource employed at a current time, a "virtual" field, indicative of at least one virtual amount of the resource to be employed at one or more of the defined points in time, and a "requirements" field, employed by the processing operators as temporary data storage to facilitate manipulation of values within the "real" field and the "virtual" field employing the processing operators.

2. The method of claim 1, further comprising a resource space time data structure for the computing system, the resource space time data structure comprising (i) multiple virtual space time variables corresponding to the defined points in time, each virtual space time variable being associated with a respective virtual amount of a "virtual" field of at least one resource amount data structure, (ii) a current virtual space variable indicative of a virtual space currently being considered by the job scheduling algorithm, and (iii) a last interfering virtual space variable indicative of a virtual space up to which the job scheduling algorithm considers when considering the current virtual space, wherein a virtual space corresponds to a virtual amount of the "virtual" field and its associated virtual space time variable, and wherein the multiple virtual space time variables, current virtual space variable and last interfering virtual space variable are global variables for the plurality of resources of the computing system.

3. The method of claim 1, wherein the "real" field of each resource amount comprises an actual amount of the resource currently being employed, and each virtual amount of the "virtual" field comprises the actual amount currently being employed in addition to an amount increase or decrease comprising an amount of the resource virtually employed as a result of one or more decisions of the job scheduling algorithm.

4. The method of claim 1, wherein the at least one virtual amount of the "virtual" field comprises a list of virtual amounts that provides virtual resource usage at various increments of time.

5. The method of claim 1, further comprising manipulating a value of a data member of a resource space data structure of the resource space data structures employing the processing operators, and subsequent to the manipulating the value, referencing by the job scheduling algorithm the value to facilitate scheduling usage of a resource of the plurality of resources by the computer jobs, and wherein the job scheduling algorithm has no knowledge from which resource space data structure a particular resource usage amount originates.

6. The method of claim 1, wherein the processing operators specify a set of resource space data structures that the job scheduling algorithm employs in making a particular scheduling decision.

7. The method of claim 1, wherein the processing operators comprise generic processing operators employable across the resource space data structures, and wherein the processing operators comprise at least some of:

$Req=0;$ $Req=Req+Res(J);$ $Req=Req-Res(J);$ $Req=MAX\{Req, 0\};$ $R=R+Req;$ $R=R-Req;$ $V0=R;$ $Vi=Vi-1;$ $Vi=Vi+Req;$ and $Vi=Vi-Req;$ wherein
Req=requirements field for a resource amount;
Res(J)=resource usage for job J;
R=real field of a resource amount indicating actual resource usage;
V0=virtual resource amount used at time T0; and
Vi=virtual resource amount used at time Ti.

8. A computer system for facilitating scheduling of computer jobs of a computing system comprising a plurality of resources, the computer system comprising:
a memory, and
a processor, in communications with the memory, wherein the computer system is configured to perform a method, the method comprising:
separating a job scheduling algorithm responsible for scheduling the computer jobs from processing to manipulate resource space data structures, the resource space data structures comprising a plurality of data members for tracking recorded usage of the plurality of resources by the computer jobs, the separating comprising:
(i) providing resource space data structures for recording usage of the plurality of resources by computer jobs; and
(ii) providing processing operators for facilitating manipulation of at least one value of at least one data member of the plurality of data members of the resource space data structures, wherein the job scheduling algorithm accesses the processing operators to manipulate the at least one value of the at least one data member, thereby facilitating maintaining the resource space data structures separate from the job scheduling algorithm,
wherein the job scheduling algorithm makes job scheduling decisions by, in part, manipulating the at least one value of the at least one data member employing the processing operators wherein the resource space data structures comprise resource amount data structures, the resource amount data structures comprising data members of the plurality of data members, the data members including recorded usage of the plurality of resource by scheduled computer job at defined points in time, and wherein each resource amount data structure facilitates tracking usage of a particular resource of the plurality of resources of the computing system, and each resource amount data structure comprises a "real" field, indicative of an actual amount of the resource employed at a current time, a "virtual" field, indicative of at least one virtual amount of the resource to be employed at one or more of the defined points in time, and a "requirements" field, employed by the processing operators as temporary data storage to facilitate manipulation of values within the "real" field and the "virtual" field employing the processing operators.

9. The computer system of claim 8, further comprising a resource space time data structure for the computing system, the resource space time data structure comprising (i) multiple virtual space time variables corresponding to the defined points in time, each virtual space time variable being associated with a respective virtual amount of a "virtual" field of at least one resource amount data structure, (ii) a current virtual space variable indicative of a virtual space currently being considered by the job scheduling algorithm, and (iii) a last interfering virtual space variable indicative of a virtual space up to which the job scheduling algorithm considers when considering the current virtual space, wherein a virtual space corresponds to a virtual amount of the "virtual" field and its associated virtual space time variable, and wherein the multiple virtual space time variables, current virtual space variable and last interfering virtual space variable are global variables for the plurality of resources of the computing system.

10. The computer system of claim 8, wherein the "real" field of each resource amount comprises an actual amount of the resource currently being employed, and each virtual amount of the "virtual" field comprises the actual amount currently being employed in addition to an amount increase or decrease comprising an amount of the resource virtually employed as a result of one or more decisions of the job scheduling algorithm.

11. The computer system of claim 8, wherein the at least one virtual amount of the "virtual" field comprises a list of virtual amounts that provides virtual resource usage at various increments of time.

12. The computer system of claim 8, further comprising manipulating a value of a data member of a resource space data structure of the resource space data structures employing the processing operators, and subsequent to the manipulating the value, referencing by the job scheduling algorithm the value to facilitate scheduling usage of a resource of the plurality of resources by the computer jobs, and wherein the job scheduling algorithm has no knowledge from which resource space data structure a particular resource usage amount originates.

13. The computer system of claim 8, wherein the processing operators specify a set of resource space data structures that the job scheduling algorithm employs in making a particular scheduling decision.

14. A computer program product for facilitating of scheduling of computer jobs of a computing system comprising a plurality of resources, the computer program product comprising:
a tangible storage medium readable by a processor and storing executable instructions for execution by the processor to perform a method comprising:
separating a job scheduling algorithm responsible for scheduling the computer jobs from processing to manipulate resource space data structures, the resource space data structures comprising a plurality of data members for tracking recorded usage of the plurality of resources by the computer jobs, the separating comprising:
(i) providing resource space data structures for recording usage of the plurality of resources by computer jobs; and
(ii) providing processing operators for facilitating manipulation of at least one value of at least one data member of the plurality of data members of the resource space data structures, wherein the job scheduling algorithm accesses the processing operators to manipulate the at least one value of the at least one data member, thereby facilitating maintaining the resource space data structures separate from the job scheduling algorithm,
wherein the job scheduling algorithm makes job scheduling decisions by, in part, manipulating the at least one value of the at least one data member employing the processing operators wherein the resource space data structures comprise resource amount data structures, the resource amount data structures comprising data members of the plurality of data members, the data members including recorded usage of the plurality of resource by scheduled computer job at defined points in time, and wherein each resource amount data structure facilitates tracking usage of a particular resource of the plurality of resources of the computing system, and each resource amount data structure comprises a "real" field, indicative of an actual amount of the resource employed at a current time, a "virtual" field, indicative of at least one virtual amount of the resource to be employed at one or more of the defined points in time, and a "requirements" field, employed by the processing operators as temporary data storage to facilitate manipulation of values within the "real" field and the "virtual" field employing the processing operators.

15. The at least one computer program product of claim 14, further comprising a resource space time data structure for the computing system, the resource space time data structure comprising (i) multiple virtual space time variables corresponding to the defined points in time, each virtual space time variable being associated with a respective virtual amount of a "virtual" field of at least one resource amount data structure, (ii) a current virtual space variable indicative of a virtual space currently being considered by the job scheduling algorithm, and (iii) a last interfering virtual space variable indicative of a virtual space up to which the job scheduling algorithm considers when considering the current virtual space, wherein a virtual space corresponds to a virtual amount of the "virtual" field and its associated virtual space time variable, and wherein the multiple virtual space time variables, current virtual space variable and last interfering virtual space variable are global variables for the plurality of resources of the computing system.

16. The at least one computer program product of claim 14, further comprising manipulating a value of a data member of a resource space data structure of the resource space data structures employing the processing operators, and subsequent to the manipulating the value, referencing by the job scheduling algorithm the value to facilitate scheduling usage of a resource of the plurality of resources by the computer jobs, and wherein the job scheduling algorithm has no knowledge from which resource space data structure a particular resource usage amount originates.

\* \* \* \* \*